(12) United States Patent
Oh et al.

(10) Patent No.: US 10,132,533 B2
(45) Date of Patent: Nov. 20, 2018

(54) COOLING AND HEATING CUP HOLDER

(71) Applicant: Hyundai Motor Company, Seoul (KR)

(72) Inventors: Man Ju Oh, Yongin-si (KR); Jae Woong Kim, Hwaseong-si (KR); Jae Woo Park, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 493 days.

(21) Appl. No.: 14/521,311

(22) Filed: Oct. 22, 2014

(65) Prior Publication Data

US 2015/0362229 A1 Dec. 17, 2015

(30) Foreign Application Priority Data

Jun. 13, 2014 (KR) .................. 10-2014-0072051

(51) Int. Cl.
*F25B 21/04* (2006.01)
*B60N 3/10* (2006.01)

(52) U.S. Cl.
CPC .............. *F25B 21/04* (2013.01); *B60N 3/104* (2013.01)

(58) Field of Classification Search
CPC ....................................................... B60N 3/104
See application file for complete search history.

(56) References Cited

U.S. PATENT DOCUMENTS

| 7,937,954 | B2 * | 5/2011 | Kang | ................... | B60N 2/4686 |
| | | | | | 62/244 |
| 2004/0025517 | A1 * | 2/2004 | Fong | ................. | B60H 1/00478 |
| | | | | | 62/3.61 |
| 2012/0104000 | A1 | 5/2012 | Lofy | | |
| 2013/0174578 | A1 * | 7/2013 | Brija | ....................... | F25B 21/04 |
| | | | | | 62/3.3 |

FOREIGN PATENT DOCUMENTS

| CA | 2426946 | A1 * | 5/2002 | .......... B60N 2/4686 |
| DE | 101 30 826 | A1 | 1/2003 | |
| DE | 10130826 | A1 * | 1/2003 | .......... B60N 2/4686 |
| DE | 102011000527 | A1 * | 8/2012 | ............. B60N 3/104 |
| JP | H03-236578 | A | 10/1991 | |
| JP | 2000-514170 | A | 10/2000 | |
| JP | 2001-253290 | A | 9/2001 | |
| JP | 2003-304977 | A | 10/2003 | |
| JP | 2005-008006 | A | 1/2005 | |
| KR | 10-2010-0115565 | A | 10/2010 | |
| KR | 10-2012-0020316 | A | 3/2012 | |
| KR | 10-2012-0066212 | A | 6/2012 | |
| KR | 10-2013-0060506 | A | 6/2013 | |
| KR | 10-2014-0036056 | A | 3/2014 | |

* cited by examiner

*Primary Examiner* — Henry Crenshaw
(74) *Attorney, Agent, or Firm* — Morgan, Lewis & Bockius LLP

(57) ABSTRACT

A cooling and heating cup holder may include a plurality of holder bodies having a container shape, a plurality of thermoelectric elements each provided to sides of the plurality of holder bodies, a heat dissipating part installed to be thermally connected to a heat dissipating surface of the plurality of thermoelectric elements, a housing embedding the heat dissipating part and having an air inlet formed at an upper portion thereof, and a blower being embedded in the housing and positioned at an upper portion or a lower portion of the heat dissipating part to allow the air discharged from a bent part and introduced through the air inlet to be heat-exchanged.

14 Claims, 2 Drawing Sheets

COOLING AND HEATING CUP HOLDER

CROSS REFERENCE TO RELATED APPLICATION

The present application claims priority to Korean Patent Application No. 10-2014-0072051 filed Jun. 13, 2014, the entire contents of which is incorporated herein for all purposes by this reference.

BACKGROUND OF THE INVENTION

Field of the Invention

The present invention relates to a cooling and heating cup holder capable of being mounted in a vehicle, or the like to store a cup and perform cooling and heating functions.

Description of Related Art

A vehicle, or the like, has been provided with various cup holders. This cup holder generally has only a simple holding function. However, in some vehicles, a cup holder having cooling and heating functions has been introduced. In the case of this cup holder, a thermoelectric element using electrical energy has been used to achieve both cooling and heating effects, but a technology of efficiently mounting the cup holder in the vehicle and efficiently providing an air conditioning system is insufficient. The reason is probably that there was no an effort to mount the cup holder capable of performing both the cooling and heating functions in the vehicle up to the present so as to allow a practical function to be appropriately implemented.

The present invention relates to a cooling and heating storage apparatus of a cup holder using a thermoelectric element, and more particularly, to a cup holder storage apparatus capable of making a beverage cold or hot by allowing the thermoelectric element having a cooled surface and a heated surface generated upon being applied with power to be in contact with a surface of the cup holder and using heat conduction characteristics, in which heat exchange between the thermoelectric elements and heat dissipating fins is performed in a large area. In this configuration, air flows from an upper direction to a lower direction, and an air inlet is formed so that the air is introduced toward a bent part of a passenger body side of an interior main air conditioning apparatus of a vehicle, which are to improve performance of a cooling and heating cup holder.

Korean Patent Laid-Open Publication No. 10-2012-0066212 A entitled "Cooling and Heating Box of Vehicle" according to the related art discloses a cooling and heating box of a vehicle capable of improving cooling and heating efficiencies. The related art has proposed a cooling and heating box of a vehicle using a thermoelectric element and including a container mounted in an interior of the vehicle, the cooling and heating box including a plurality of thermoelectric elements mounted on an outer peripheral surface of a bottom side of the container so that one side of the thermoelectric element contacts the outer peripheral surface, a duct being in contact with the other side of the thermoelectric element and formed to discharge heat generated from the other side of the thermoelectric element during an operation of the thermoelectric element to the outside, and a controlling unit performing a control so as to supply power by connecting the thermoelectric elements in parallel with each other in the case in which it is intended to used as a heating box and connecting the thermoelectric elements in series with each other in the case in which it is intended to used as a cooling box, whereby cooling and heating efficiencies may be improved in the case in which it is used as the heating box and in the case in which it is used as the cooling box.

However, even though the related art is used, it is not an efficient structure when the air conditioning system is efficiently provided, or the cooling and heating functions are simultaneously performed, or one thermoelectric element is used.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling and heating cup holder capable of having configuration disposed to improve a heat exchanging efficiency when a vehicle is cooled and maximizing a heat efficiency when cooling and heating functions are simultaneously performed in a plurality of cup holders.

According to various aspects of the present invention, a cooling and heating cup holder may include a plurality of holder bodies with a container shape having an opened upper portion and formed of a thermally conductive material, a plurality of thermoelectric elements each provided to sides of the plurality of holder bodies, each having one side connected to an air conditioning surface and another side connected to a heat dissipating surface, and installed so that the air conditioning surface is thermally connected to a side of each holder body, a heat dissipating part installed to be thermally connected to the heat dissipating surface of the plurality of thermoelectric elements, formed as one body, and including a heat dissipating fin forming an air passage in a vertical direction, a housing embedding the heat dissipating part and having an air inlet formed at an upper portion thereof, the air inlet being formed toward a flowing side of air discharged from a bent part of a passenger body side of an interior main air conditioning apparatus of a vehicle, and a blower being embedded in the housing and positioned at an upper portion or a lower portion of the heat dissipating part to allow the air discharged from the bent part and introduced through the air inlet to be heat-exchanged while flowing in a lower direction along the air passage formed in the heat dissipating fin of the heat dissipating part.

The air inlet may be formed at any of an upper front of the housing or an upper end of the housing to be provided to the flowing side of the air discharged from the bent part of the passenger body side.

The plurality of holder bodies may include a pair of holder bodies disposed in parallel to each other in a width direction of the housing.

The plurality of thermoelectric elements may each independently be a cooling mode or a heating mode.

A heat pipe is provided between the heat dissipating surface of each thermoelectric element and the heat dissipating part and the heat dissipating surface of each thermoelectric element, and the heat dissipating part may be thermally connected to each other, the heat dissipating surface of each thermoelectric element may be closely adhered to one surface of the heat pipe, and the heat dissipating part may be closely adhered to another surface of the heat pipe.

In the case in which the holder body is provided to a front seat center console side of the vehicle, each thermoelectric element, the heat pipe, and the heat dissipating part may be disposed at a rear of the holder body, and the air inlet may be formed in the upper portion of the housing.

In the case in which the holder body is provided to a rear seat armrest side of the vehicle, each thermoelectric element, the heat pipe, and the heat dissipating part may be disposed at a front of the holder body, and the air inlet may be formed in the upper portion of the housing.

A sum of areas of the heat dissipating surfaces of each of the thermoelectric elements may be smaller than an area of an adjacent surface of the heat pipe.

The blower may be provided to the lower portion of the heat dissipating part to vertically receive the air introduced through the air inlet from the lower portion of the heat dissipating part.

The blower may be provided to a side of the lower portion of the heat dissipating part to horizontally receive the air introduced through the air inlet from the lower portion of the heat dissipating part.

The air inlet may be provided with a grille part to prevent an introduction of foreign materials from an outside.

An upper end portion of the holder body may be provided with a door opening or closing the upper end of the holder body, and the air inlet may be opened or closed together with the upper end of the holder body by the door.

The door may be rotated at one end portion thereof and open or close an upper end of the holder body, and another end portion of the door is disposed to face the air inlet based on the holder body, such that the air inlet may be closed by the other end portion of the door when the door is closed.

The housing may include a first guide extended from the air inlet and coupled to the upper portion of the heat dissipating part and a second guide coupled to the lower portion of the heat dissipating part and embedding the blower.

The second guide may be provided with a discharging hole discharging air in a horizontal direction of the blower.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
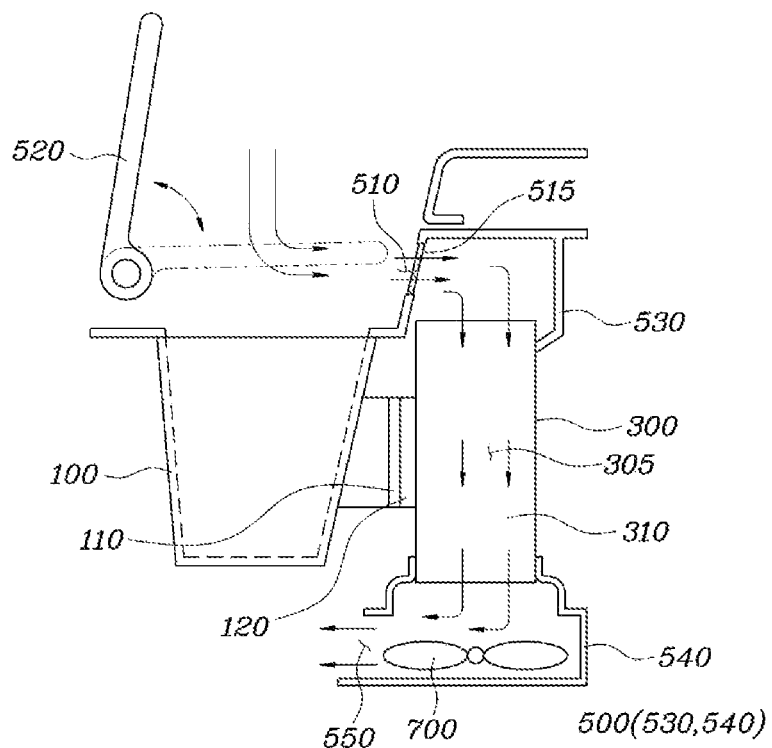
FIG. 1 is a side view showing an exemplary cooling and heating cup holder according to the present invention.
Figure 2:
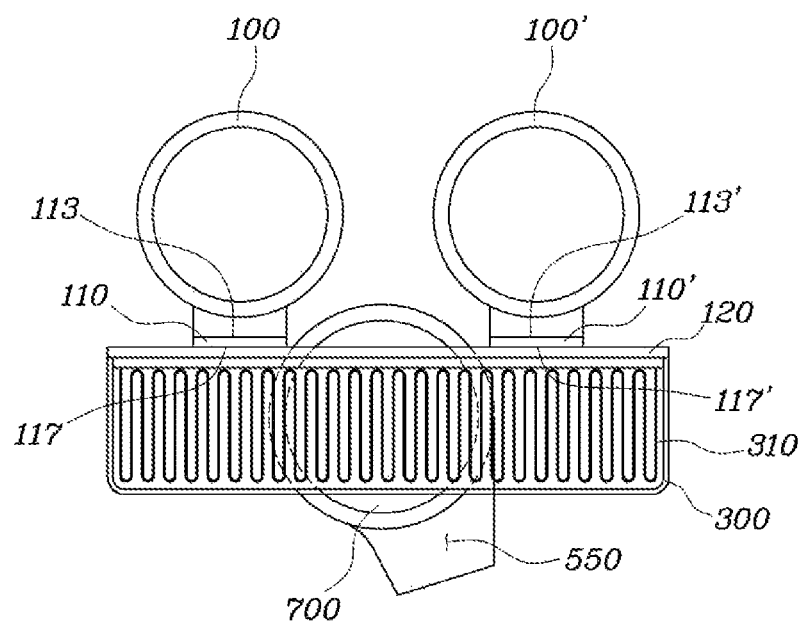
FIG. 2 is a plan view showing an exemplary cooling and heating cup holder having a blower formed at a lower portion thereof according to the present invention.
Figure 3:
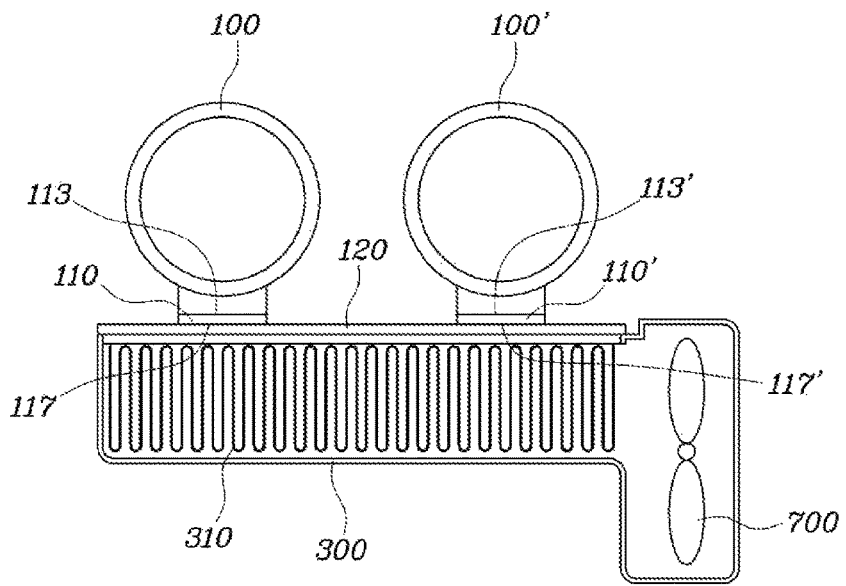
FIG. 3 is a plan view showing an exemplary cooling and heating cup holder having a blower formed at a side portion thereof according to an exemplary embodiment of the present invention.
Figure 4:
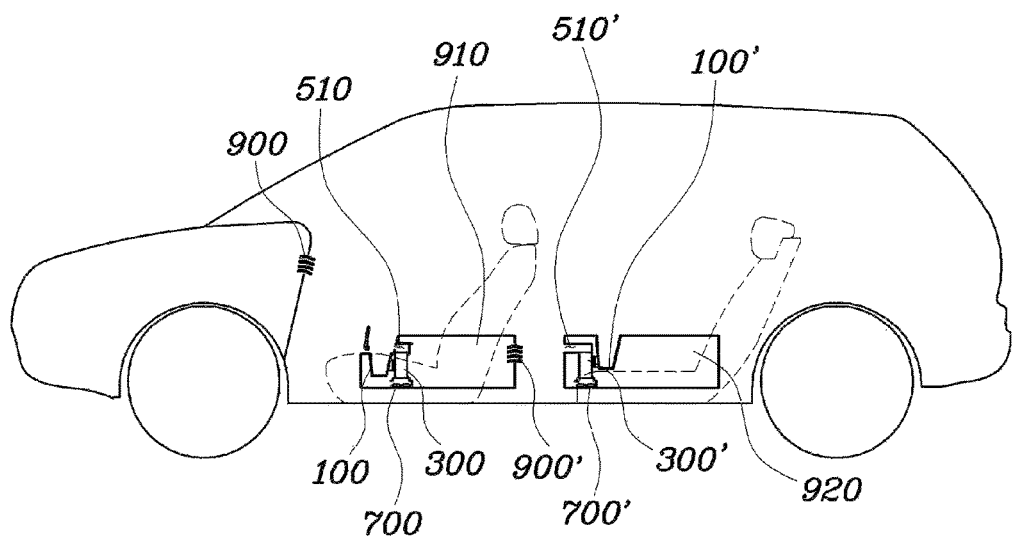
FIG. 4 is an operation view of an exemplary cooling and heating cup holder according to the present invention.

FIG. 1 is a side view showing a cooling and heating cup holder according to various embodiments of the present invention. FIG. 2 is a plan view showing the cooling and heating cup holder having a blower formed at a lower portion thereof according to various embodiments of the present invention. FIG. 3 is a plan view showing the cooling and heating cup holder having a blower formed at a side portion thereof according to various embodiments of the present invention. FIG. 4 is an operation view of the cooling and heating cup holder according to various embodiments of the present invention.

Referring to FIGS. 1 to 4, the cooling and heating cup holder may include a plurality of holder bodies 100 having a container shape with an opened upper portion and formed of a thermally conductive material, a plurality of thermoelectric elements 110 each having one side connected to an air conditioning surface and the other side connected to a heat dissipating surface, each provided to sides of the plurality of holder bodies 100, and installed so that the air conditioning surface is thermally connected to the side of the holder body 100; a heat dissipating part 300 installed to be thermally connected to the heat dissipating surface of the plurality of thermoelectric elements 110, formed in a state configured as one body, and including a heat dissipating fin 310 forming an air passage in a vertical direction; a housing 500 embedding the heat dissipating part 300 and having an air inlet 510 formed at an upper portion thereof, the air inlet 510 being formed toward a flowing side of the air discharged from a bent part 900 of a passenger body side of an interior main air conditioning apparatus of a vehicle; and a blower 700 being embedded in the housing 500 and positioned at an upper portion or a lower portion of the heat dissipating part 300 to allow the air introduced through the air inlet 510 to be heat-exchanged while flowing in a lower direction along the air passage formed in the heat dissipating fin 310 of the heat dissipating part 300.

In case of the cooling and heating cup holder, when the thermoelectric element 110 is used, a temperature of a received air is a very important factor of improving performance. The present invention is to increase an efficiency of the cooling and heating cup holder in the case in which an interior of the vehicle is cooled, and an object of the present invention is to improve performance of the cooling and heating cup holder by designing the cooling and heating cup holder so as to immediately receive a cooled air discharged from the bent part 900 of the passenger body side of the interior main air conditioning apparatus of the vehicle so that the air is heat-exchanged while flowing in a vertical direction.

In this case, the air inlet 510 is formed at any one of an upper front of the housing 500 or an upper end of the housing 500 to be provided to the flowing side of the air discharged from the bent part 900 of the passenger body side.

That is, the air inlet 510 may be provided to the upper front of the housing 500, which is a position facing the bent part 900 of the passenger body side, so that the air discharged from the bent part 900 of the passenger body side may be immediately received. In addition, the air discharged from the bent part 900 of the passenger body side has a property that it flows in a lower direction due to a low temperature. In order to receive the air, the air inlet 510 may be provided to the upper front of the housing 500 to directly receive the air. By forming the air inlet 510 as described above, heat dissipating performance of the cooling and heating cup holder may be improved upon cooling the vehicle. In this case, the bent part 900 of the passenger body side may be provided to a dash board of the vehicle and a rear of a front seat center console 910.

Meanwhile, the plurality of holder bodies 100 are formed of the thermally conductive material and cooled or heated depending on thermal conduction. In addition, the holder body 100 is provided with a contacting part having a flat shape protruded by pressing the side from an inner side to an outer side so that the air conditioning surface of the thermoelectric element 110 is closely adhered. The plurality of holder bodies 100 include a pair of holder bodies disposed in parallel with each other in a width direction of the housing 500. This design is to simplify a layout of the cooling and heating cup holder and improve a space efficiency of the vehicle.

In addition, as the thermoelectric element 110 according to various embodiment of the present invention, a peltier element may be used. The peltier element is basically formed by an air conditioning surface and a heat dissipating surface to thereby serve as a heat pump transferring heat from one side to the other side when electricity is applied. That is, since the peltier element performs an important function maintaining a temperature difference between the air conditioning surface and the heat dissipating surface, the heat dissipating performance affects the cooling performance. Therefore, the interior air which is air-conditioned when the vehicle is cooled is immediately received and used, such that the heat dissipating performance and the cooling performance of the cooling and heating cup holder are improved.

Here, the plurality of thermoelectric elements 110 may each independently perform a cooling mode or a heating mode. That is, the respective thermoelectric elements 110 may be independently operated as at least one of a cooling mode, a heating mode, or a stopping mode.

Meanwhile, the heat dissipating part 300 is configured as one body that the plurality of thermoelectric elements 110 are thermally connected to each other in parallel on one surface, such that cost may be reduced and a heat exchanging efficiency may be improved in comparison to the related art configuring the plurality of heat dissipating parts 300. A detailed description thereof will be described below.

According to various embodiments of the present invention, a heat pipe 120 may be provided between the heat dissipating surface of the thermoelectric element 110 and the heat dissipating part 300, such that the heat dissipating surface of the thermoelectric element 110 and the heat dissipating part 300 may be thermally connected to each other, the heat dissipating surface of each thermoelectric element 110 may be closely adhered to one surface of the heat pipe 120, and the dissipating part 300 may be closely adhered to the other surface thereof.

Here, the heat pipe 120, which is formed to efficiently transfer heat transferred from the thermoelectric element 110, which is closely adhered to one surface of the heat pipe, to the other surface of the heat pipe, allows the heat of the thermoelectric element 110 to be quickly conducted in the heat pipe 120 to thereby transfer the heat while maximally using an area of the heat dissipating part 300. Therefore, the plurality of thermoelectric elements 110 are thermally connected to the heat dissipating part 300 formed in one body by the heat pipe 120, such that when one side of each of the thermoelectric elements 110 is operated in the cooling mode and the other side thereof is operated in the heating mode, the heat efficiency may be increased due to heat pump characteristics of the peltier element used as the thermoelectric element 110. In addition, in the case in which only one thermoelectric element 110 is operated, since the area of the heat dissipating part 300 may be wider than the plurality of thermoelectric elements 110, the heat exchanging and heat dissipating performance may be improved.

Meanwhile, referring to FIG. 4, in the case in which the holder body 100 is provided to the front seat center console 910 side of the vehicle, the thermoelectric element 110, the heat pipe 120, and the heat dissipating part 300 may be disposed at a rear of the holder body 100, and the air inlet 510 may be formed in an upper portion of the housing 500. On the other hand, in the case in which the holder body 100 is provided to a rear seat armrest 920 side of the vehicle, the thermoelectric element 110, the heat pipe 120, and the heat dissipating part 300 may be disposed at a front of the holder body 100, and the air inlet 510 may be formed in an upper portion of the housing 500.

Specifically, in the case in which the holder body 100 is provided to the front seat center console 910 side of the vehicle, the air inlet 510 and the heat dissipating part 300 may be formed in a rear of the holder body 100 in order to receive the air discharged from the bent part 900 of the passenger body side formed in the dash board. On the other hand, in the case in which the holder body 100 is provided to the rear seat armrest 920 side of the vehicle, the air inlet 510' and the heat dissipating part 300' may be formed in a front of the holder body 100' in order to receive the air discharged from the bent part 900' of the passenger body side formed in the rear of the front seat center console 910. The above-mentioned structure more easily receives the air discharged from the bent part 900' of the passenger body side, thereby making it possible to improve the heat exchanging and heat dissipating performance of the cooling and heating cup holder. In addition, since the air-conditioned air is immediately received, an efficiency of the thermoelectric element 110 may be maximized.

In various exemplary embodiments of the present invention, a sum of areas of the heat dissipating surfaces of the respective thermoelectric elements 110 may be smaller than an area of one surface of the heat pipe 120. That is, by forming the area of the heat pipe 120 to be wider than the areas of the heat dissipating surfaces of the thermoelectric elements 110, a cross section area capable of dissipating the heat from the heat dissipating part 300 becomes wide, thereby making it possible to improve the heat dissipating efficiency.

Meanwhile, the blower 700 may be provided to a lower portion of the heat dissipating part 300 as shown in FIG. 2 to thereby vertically receive the air from the lower portion of the heat dissipating part 300. Alternatively, the blower 700 may be provided to a side of the lower portion of the heat dissipating part 300 as shown in FIG. 3 to thereby horizontally receive the air from the lower portion of the heat dissipating part 300.

That is, the blower 700 may be provided to the lower portion or the side of the lower portion of the heat dissipating part 300 to thereby serve to guide the air to smoothly pass through the heat dissipating part 300 in a vertical direction or a horizontal direction, and a position of the blower 700 or 700' according to a shape of the front seat center console 910 or the rear seat armrest 920 of the vehicle is selected and applied, such that an inner space may be efficiently used.

In addition, the air inlet 510 may be provided with a grille part to prevent introduction of foreign materials from the outside. In addition, an upper end portion side of the holder body 100 may be provided with a door 520 opening or closing the upper end of the holder body 100, and the air inlet 510 may be opened or closed together with the upper end of the holder body 100 by the door 520. Here, the door 520 may be pivotally rotated at one end portion thereof and open or close the upper end of the holder body 100, and another end portion of the door 520 may be disposed to face the air inlet 510 based on the holder body 100, such that the air inlet 510 may be closed by the other end portion of the door 520 when the door 520 is closed.

For example, when the cooling and heating cup holder is not used, the air inlet 510 is closed by the door 520, thereby making it possible to usually prevent the foreign material from the outside from being introduced into the air inlet 510. Therefore, the door 520 serves to open or close the holder body 100 and also serves to open or close the air inlet 510 at the same time. On the other hand, in the case in which the door 520 is opened to use the cooling and heating cup holder, the air inlet 510 is also opened to thereby receive the air discharged from the bent part 900 of the passenger body side, in which the air is received while the foreign material is filtered by the grille part, thereby protecting the internal system.

Meanwhile, the housing 500 may include a first guide 530 extended from the air inlet 510 and coupled to the upper portion of the heat dissipating part 300 and a second guide 540 coupled to the lower portion of the heat dissipating part 300 and embedding the blower 700. As such, since only a space in which the thermoelectric element 110, the heat pipe 120, and the heat dissipating part 300 are closely adhered to one another is necessary by dividing the housing 500 into the upper and lower portions and then coupling them, space efficiency may be improved. Since the housing 500 may be simply coupled to the upper and lower portions of the heat dissipating part 300 upon forming the air passage, assembly property may be improved.

Here, the second guide 540 may be provided with a discharging hole 550 discharging the air in a horizontal direction of the blower 700. This structure is effective in forming the passage in the case in which the cooling and heating cup holder is designed so that the air discharged to the discharging hole 550 by the blower 700 is discharged to a surrounding of the holder body 100, in addition to the efficient layout of the cooling and heating cup holder.

According to the cooling and heating cup holder having the structure as described above, the air conditioning lines of the cooling and heating cup holder are efficiently disposed, such that the interior air which is air-conditioned upon cooling of the vehicle is immediately received and used, thereby making it possible to further improve the heat exchanging and heat dissipating efficiency.

In addition, in the case in which the plurality of thermoelectric elements simultaneously operate the cooling mode and the heating mode, since the heat of the thermoelectric elements is transferred to the wider area, the cooling and heating performances may be significantly improved.

Particularly, in the case in which one thermoelectric element is operated, the area of the heat dissipating fin to which the heat is transferred is increased as compared to a case in which the plurality of thermoelectric elements are operated, thereby making it possible to significantly improve the cooling and heating performances.

In addition, the heat dissipating part constituted by one body is used, such that manufacturing costs may be reduced as compared to an independent heat dissipating fin configuration and productivity may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling and heating cup holder comprising:
    a plurality of holder bodies, each being physically separated, having a container shape with an opened upper portion and formed of a thermally conductive material;
    a plurality of thermoelectric elements each provided to sides of the plurality of holder bodies, a first side surface of each of the plurality of thermoelectric elements forming an air conditioning surface and a second side surface of each of the plurality of thermoelectric elements forming a heat dissipating surface, and installed so that the air conditioning surface is thermally connected to a side of each holder body;
    a heat dissipating part installed to be thermally connected to the heat dissipating surface of the plurality of thermoelectric elements, formed as one body, and including a heat dissipating fin forming an air passage in a vertical direction;
    a housing embedding the heat dissipating part and having an air inlet formed at an upper front of the housing, the air inlet facing an outlet of an interior main air conditioning apparatus of a vehicle; and
    a blower embedded in the housing and positioned at an upper portion or a lower portion of the heat dissipating part to allow the air discharged from the outlet of a bent part and introduced through the air inlet to be heat-exchanged while flowing in a lower direction along the air passage formed in the heat dissipating fin of the heat dissipating part, wherein the bent part of the passenger body side is provided at a dash board of the vehicle or at a rear of a front seat center console, and wherein an upper end portion of the at least one of the plurality of holder bodies is provided with a door configured for opening or closing both of an upper end of the at least one of the plurality of holder bodies and the air inlet of the housing together.

2. The cooling and heating cup holder of claim 1, wherein the air inlet is formed at any of an upper front of the housing or an upper end of the housing to be provided to the flowing side of the air discharged from the bent part of the passenger body side.

3. The cooling and heating cup holder of claim 1, wherein the plurality of holder bodies include a pair of holder bodies disposed in parallel to each other in a width direction of the housing.

4. The cooling and heating cup holder of claim 1, wherein the plurality of thermoelectric elements each independently operate in a cooling mode or in a heating mode.

5. The cooling and heating cup holder of claim 1, wherein a heat pipe is provided between the heat dissipating surface of each thermoelectric element and the heat dissipating part, and the heat dissipating surface of each thermoelectric element and the heat dissipating part are thermally connected to each other, the heat dissipating surface of each thermoelectric element is adhered to one surface of the heat pipe, and the heat dissipating part is adhered to another surface of the heat pipe.

6. The cooling and heating cup holder of claim 5, wherein in the case in which the at least one of the plurality of holder bodies is provided to a front seat center console side of the vehicle, each thermoelectric element, the heat pipe, and the heat dissipating part are disposed at a rear of the at least one of the plurality of holder bodies, and the air inlet is formed in the upper portion of the housing.

7. The cooling and heating cup holder of claim 5, wherein in the case in which the at least one of the plurality of holder bodies is provided to a rear seat armrest side of the vehicle, each thermoelectric element, the heat pipe, and the heat dissipating part are disposed at a front of the at least one of the plurality of holder bodies, and the air inlet is formed in the upper portion of the housing.

8. The cooling and heating cup holder of claim 5, wherein a sum of areas of the heat dissipating surfaces of each of the thermoelectric elements is smaller than an area of an adjacent surface of the heat pipe.

9. The cooling and heating cup holder of claim 1, wherein the blower is provided to the lower portion of the heat dissipating part to vertically receive the air introduced through the air inlet from the lower portion of the heat dissipating part.

10. The cooling and heating cup holder of claim 1, wherein the blower is provided to a side of the lower portion of the heat dissipating part to horizontally receive the air introduced through the air inlet from the lower portion of the heat dissipating part.

11. The cooling and heating cup holder of claim 1, wherein the air inlet is provided with a grille part to prevent an introduction of foreign materials from an outside.

12. The cooling and heating cup holder of claim 1, wherein the door is rotated at one end portion thereof and opens or closes the upper end of the at least one of the plurality of holder bodies, and another end portion of the door is disposed to face the air inlet based on the at least one of the plurality of holder bodies, such that the air inlet is closed by the other end portion of the door when the door is closed.

13. The cooling and heating cup holder of claim 1, wherein the housing includes a first guide extended from the air inlet and coupled to the upper portion of the heat dissipating part and a second guide coupled to the lower portion of the heat dissipating part and embedding the blower.

14. The cooling and heating cup holder of claim 13, wherein the second guide is provided with a discharging hole discharging air in a horizontal direction of the blower.

* * * * *